United States Patent
Kim et al.

(10) Patent No.: US 11,209,965 B2
(45) Date of Patent: Dec. 28, 2021

(54) METHOD FOR DISPLAYING HANDLER AND ELECTRONIC DEVICE THEREFOR

(71) Applicant: Samsung Electronics Co., Ltd., Gyeonggi-do (KR)

(72) Inventors: Jung-Ryul Kim, Seoul (KR); Min-Kyu Park, Seoul (KR); Min-Ji Lee, Seoul (KR); Jung-Woo Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 35 days.

(21) Appl. No.: 15/915,527

(22) Filed: Mar. 8, 2018

(65) Prior Publication Data

US 2018/0260102 A1   Sep. 13, 2018

(30) Foreign Application Priority Data

Mar. 8, 2017   (KR) .................... 10-2017-0029570

(51) Int. Cl.
| | |
|---|---|
| *G06F 17/00* | (2019.01) |
| *G06F 3/0484* | (2013.01) |
| *G06F 3/0482* | (2013.01) |
| *G06F 3/0488* | (2013.01) |
| *G06F 3/0486* | (2013.01) |

(Continued)

(52) U.S. Cl.
CPC ........ *G06F 3/04842* (2013.01); *G06F 3/0482* (2013.01); *G06F 3/0486* (2013.01); *G06F 3/04883* (2013.01); *G06F 40/103* (2020.01); *G06F 40/166* (2020.01)

(58) Field of Classification Search
CPC .. G06F 3/04842; G06F 3/0482; G06F 3/0486; G06F 3/04883; G06F 17/211; G06F 17/24; G06F 40/103; G06F 40/166; G06F 3/016; G06F 3/048; G06F 3/033; G06F 3/0354
USPC ......................................................... 715/773
See application file for complete search history.

(56) References Cited

U.S. PATENT DOCUMENTS 5,760,773 A * 6/1998 Berman ................ G06F 1/1626
                                                 345/672
6,891,551 B2   5/2005 Keely et al.
(Continued)

FOREIGN PATENT DOCUMENTS

| KR | 1020140081793 | 7/2014 |
|---|---|---|
| KR | 1020160020531 | 2/2016 |

OTHER PUBLICATIONS

International Search Report dated Jun. 19, 2018 issued in counterpart application No. PCT/KR2018/002795, 9 pages.
(Continued)

*Primary Examiner* — Jason T Edwards
(74) *Attorney, Agent, or Firm* — The Farrell Law Firm, P.C.

(57) ABSTRACT

Disclosed is a method for displaying a handler by an electronic device, the method includes displaying a handler for selecting a character on a screen of the electronic device; receiving a user's touch drag input to touch and move the handler; and highlighting and displaying an area regarding a character corresponding to a position of a touch with respect to the character and displaying the handler independent from the highlighted area with respect to the position of the touch, while the handler is touched as per the user's touch drag input.

16 Claims, 14 Drawing Sheets

(51) Int. Cl.
*G06F 40/103* (2020.01)
*G06F 40/166* (2020.01)

(56) References Cited

U.S. PATENT DOCUMENTS

| | | | | |
|---|---|---|---|---|
| 8,656,296 | B1* | 2/2014 | Ouyang | G06F 3/0488 715/256 |
| 2007/0192731 | A1* | 8/2007 | Townsend | G06F 3/0488 715/788 |
| 2007/0250789 | A1* | 10/2007 | Bell | G06F 3/0486 715/800 |
| 2008/0168364 | A1* | 7/2008 | Miller | G06F 3/016 715/762 |
| 2010/0171713 | A1 | 7/2010 | Kwok et al. | |
| 2013/0067373 | A1 | 3/2013 | Weir et al. | |
| 2013/0080979 | A1 | 3/2013 | Weir et al. | |
| 2013/0285928 | A1* | 10/2013 | Thorsander | G06F 3/0488 345/173 |
| 2013/0300661 | A1 | 11/2013 | Ezra et al. | |
| 2014/0040833 | A1* | 2/2014 | McLean | G06F 3/0488 715/856 |
| 2014/0372934 | A1* | 12/2014 | Pereira | G06F 3/0482 715/781 |
| 2015/0026575 | A1* | 1/2015 | Martin | G06F 3/04842 715/720 |
| 2015/0082246 | A1 | 3/2015 | Tan et al. | |
| 2016/0054879 | A1* | 2/2016 | Chiu | G06F 3/0485 715/769 |
| 2016/0154571 | A1 | 6/2016 | Iwaizumi | |
| 2016/0283055 | A1* | 9/2016 | Haghighat | G06F 16/957 |
| 2016/0306528 | A1 | 10/2016 | Suzuki et al. | |

OTHER PUBLICATIONS

Korean Office Action dated Mar. 15, 2021 issued in counterpart application No. 10-2017-0029570, 11 pages.

* cited by examiner (a)

METHOD FOR DISPLAYING HANDLER AND ELECTRONIC DEVICE THEREFOR

PRIORITY

This application is based on and claims priority under 35 U.S.C. § 119 to Korean Patent Application No. 10-2017-0029570, filed on Mar. 8, 2017, in the Korean Intellectual Property Office, the disclosure of which is incorporated by reference herein in its entirety.

BACKGROUND

1. Field

The disclosure relates generally to electronic devices displaying handlers and methods for the same, and more particularly, to electronic devices displaying handlers according to users' touch drags and methods for the same.

2. Description of Related Art

As electronic devices become compact and portable, user interfaces for manipulating information displayed on electronic devices are also being developed. For example, information consisting of characters may be display on the screen of an electronic device. The user may want to copy or share with third parties, at least one character.

The user is first required to choose at least one character that he desires to copy or share. To that end, as the user keeps touching a character that he desires for a predetermined time, the character may be highlighted to indicate that the character has been chosen. The user may copy or share the highlighted character. For instance, if the user's touch selecting the character is released, a menu for controlling the highlighted character may be displayed around the highlighted area. The user may copy or share at least one character using the menu displayed.

The user may desire to choose another character with respect to the chosen character. For such purpose, the electronic device may display a handler that enables selection of other characters along with the highlighted character. When the user touches and moves the handler, the other characters may be highlighted to indicate that they have been chosen according to the movement of the handler. In this case, as the handler is moved dependent upon the character or highlighted area, the movement of the handler may be unnatural or discontinuous. In particular, where the handler moves between rows or columns of characters, the discontinuity of the movement of the handler may worsen.

Furthermore, since the handler is small in size, the user's touch on the handler may not readily be recognized by the user as to whether the user properly touches the handler.

SUMMARY

According to embodiments of the disclosure, there may be provided a method and device for intuitively and smoothly moving a handler when a user manipulates the handler to choose a character.

In order for the user to easily select the handler, the size and direction of the handler may be adjusted on the display as per the user's handler manipulation.

In accordance with an embodiment, a method for displaying a handler by an electronic device includes displaying a handler for selecting a character on a screen of the electronic device; receiving a user's touch drag input to touch and move the handler; and highlighting and displaying an area regarding a character corresponding to a position of a touch with respect to the character and displaying the handler independent from the highlighted area with respect to the position of the touch, while the handler is touched as per the user's touch drag input.

In accordance with an embodiment, an electronic device includes a display providing a screen; a touch panel detecting a user's touch drag input on the screen; a processor electrically connected with the display and the touch panel; and a memory electrically connected with the processor. The memory stores commands to, enable the processor to control the display to display a handler for selecting a character on the screen and to control the display to, while the handler is touched by the user's touch drag input to touch and move the handler, highlight and display an area regarding the character with respect to the character corresponding to a position of a touch and display the handler independent from the highlighted area with respect to the position of the touch, when the electronic device is operated.

In accordance with an embodiment, a computer program product including a computer-readable recording medium includes commands enabling the electronic device to display a handler for selecting a character on a screen of the electronic device; receive a user's touch drag input to touch and move the handler; and highlight and display an area regarding a character corresponding to a position of the touch with respect to the character and display the handler independent from the highlighted area with respect to the position of the touch, while the user touches the handler as per the user's touch drag input.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
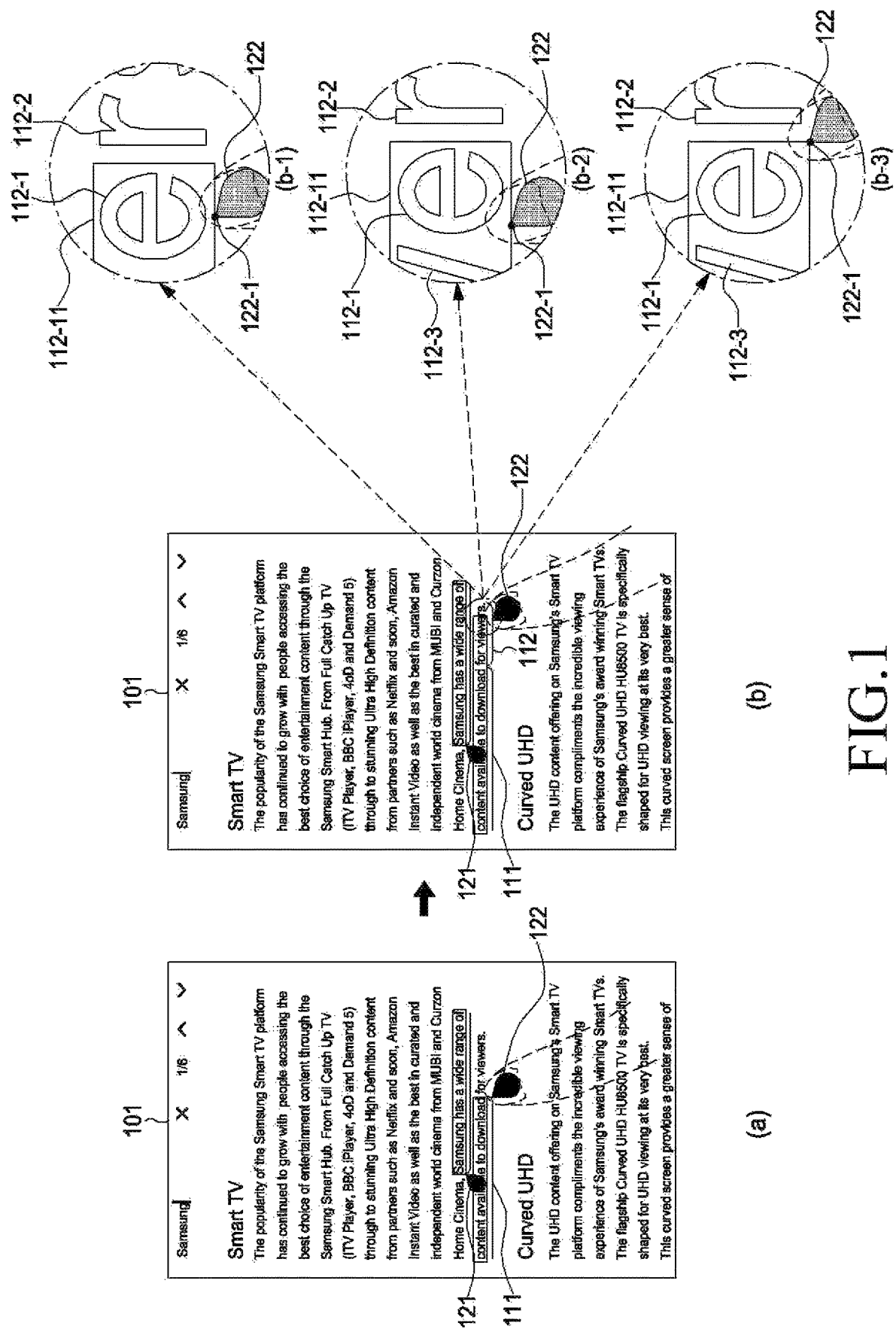
FIGS. 1, 2A, 2B, 3A, 3B, 4A, 4B, and 5 are views illustrating embodiments of using and manipulating a handler, according to an embodiment.

Embodiments and terms used in the present disclosure do not limit the present disclosure to particular embodiments, and are construed as including various modifications, equivalents, and/or alternatives according to the embodiments. As used in the present disclosure, the terms "have", "may have", "include", or "may include" indicate the existence of a feature (e.g., a number, function, operation, or a component such as a part) and do not exclude the existence of other features.

As used in the present disclosure, the terms "configured (or set) to" may be interchangeably used with the terms "suitable for", "having the capacity to", "designed to", "adapted to", "made to", or "capable of" depending on the situation. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or an application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a", "an", and "the" include plural references unless the context clearly dictates otherwise. The terms including technical and scientific terms used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

An electronic device according to various embodiments may include a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. The wearable device may include an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment, the electronic device may be a home appliance. The electronic device may include a television (TV), a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (e.g., Xbox™, and PlayStation™), an electronic dictionary, an electronic key, a camcorder, or an electronic picture frame.

According to an embodiment, the electronic device may include various medical devices (e.g., diverse portable medical measuring devices (e.g., a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a navigation device or a gyro compass), avionics, security devices, vehicular head units, industrial or home robots, automatic teller machines (ATMs), point of sales (POS) devices, or Internet of things (IoT) devices (e.g., a light bulb, various sensors, an electric or gas meter, a sprinkler, a fire alarm, a thermostat, a street light, a toaster, fitness equipment, a hot water tank, a heater, or a boiler).

According to an embodiment, the electronic device may include a part of furniture or building/structure, an electronic board, an electronic signature receiving device, a projector, or various measurement devices (e.g., devices for measuring water, electricity, gas, or electromagnetic waves). The electronic device may be one or a combination of the above-listed devices. The electronic device may be a flexible electronic device. The electronic device disclosed in the present disclosure is not limited to the above-listed devices, and may include new electronic devices depending on the development of technology.

As used herein, the term "user" may denote a human or another device (e.g., an artificial intelligence (AI) electronic device) using the electronic device.

The electronic device according to an embodiment may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd", or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application specific integrated circuit (ASIC).

Various embodiments as set forth herein may be implemented as software (e.g., a program 1140) including one or more instructions that are stored in a storage medium (e.g., internal memory or external memory) that is readable by a machine (e.g., an electronic device 1101). For example, a processor (e.g., processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. While, the term "non-transitory" simply means that the storage medium is a tangible device, and does not include a signal (e.g., an electromagnetic wave), this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 1 is a view illustrating an embodiment of using and manipulating a handler on an electronic device, according to an embodiment.

Referring to FIG. 1(a), an electronic device may display highlighted characters 111 on a screen 101. Where the user keeps touching at a particular position on the screen and drags the touch, the electronic device may highlight and display the characters 111 to indicate that the characters 111 have been selected corresponding to the position of the touch drag.

Here, highlighting and displaying the characters 111 may include highlighting and displaying an area regarding the characters 111. The area regarding the characters 111 may include at least one of, e.g., the characters themselves and a background area of the characters. Highlighting and displaying may also include displaying the characters or background area to be visually distinguished from other characters or their background area in light of, e.g., the color or brightness of at least one of the characters themselves and their background.

The electronic device may display a first handler 121 and a second handler 122 enabling additional selection of other characters. The first handler 121 and the second handler 122 may be displayed adjacent to the highlighted area. In such circumstance, the electronic device may receive a touch drag input from the user who touches and moves the second handler 122 to select other characters 112 as illustrated in FIG. 1(b).

While the user touches the screen 101, the electronic device may highlight and display an area 112-11 regarding a character 112-1 corresponding to the position of the touch with respect to the character 112-1. In this case, the area 112-11 regarding the character 112-1 may remain displayed as highlighted even when the user releases the touch. The second handler 122 may be displayed adjacent to the area 112-11 regarding the character 112-1. Displaying adjacent here may include displaying the handler so that at least part of the second handler 122 abuts the area, or so that at least part of the second handler 122 overlaps the area 112-11, or so that at least part of the second handler 122 is displayed nearly adjacent the area 112-11.

While the user touches the screen 101, the electronic device may display the second handler 122 independent from the highlighted area 112-11 with respect to the position of the touch.

Where the position of the touch, or its offset position, as per the user's touch drag, is located within the width of the character 112-1, the highlighted area may be displayed from the character 112-1 to its next character 112-2 as illustrated in FIG. 1(b-1). In other words, the highlighted area may be displayed on a character basis so that the tail of the highlighted area does not overlap the middle of a character. The second handler 122 may be displayed with respect to the position of touch independent from the highlighted area. In this case, the indicator 122-1 of the second handler 122 may be displayed within the width of the character 112-1.

The position of the touch, or its offset position, as per the user's touch drag, may be located between the character 112-1 and its previous character 112-3 as illustrated in FIG. 1(b-2). Also in this case, the highlighted area may be displayed from the character 112-1 to the next character 112-2. In other words, the highlighted area may be displayed on a character basis so that the tail of the highlighted area does not overlap the middle of a character. Also in this case, the handler second 122 may be displayed with respect to the position of touch independent from the highlighted area. In this case, the indicator 122-1 of the second handler 122 may be displayed between the character 112-1 and its previous character 112-3.

The position of the touch, or its offset position, as per the user's touch drag, may be located between the character 112-1 and its next character 112-2 as illustrated in FIG. 1(b-3). Also in this case, the highlighted area may be displayed from the character 112-1 to the next character 112-2. The second handler 122 may be displayed with respect to the position of touch independent from the highlighted area 112-11. In other words, the indicator 122-1 of the second handler 122 may be displayed between the character 112-1 and its next character 112-2.

As such, when the handler is displayed with respect to the position of the user's touch, the handler follows the user's touch, the handler may smoothly and intuitively be moved as per the user's manipulation. That is, visual feedback may clearly be provided as per the user's manipulation.

Figure 2A:
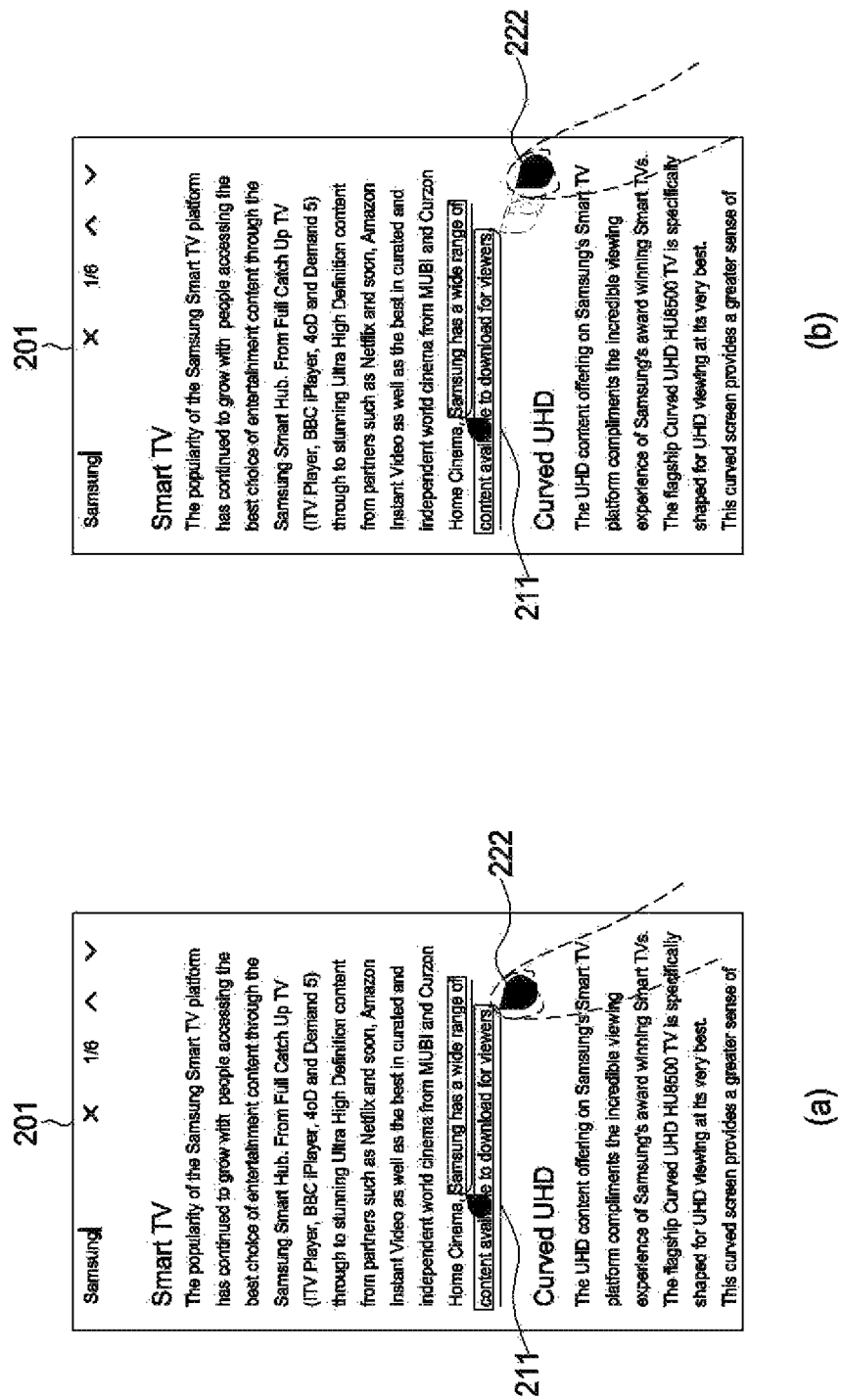
Figure 2B:
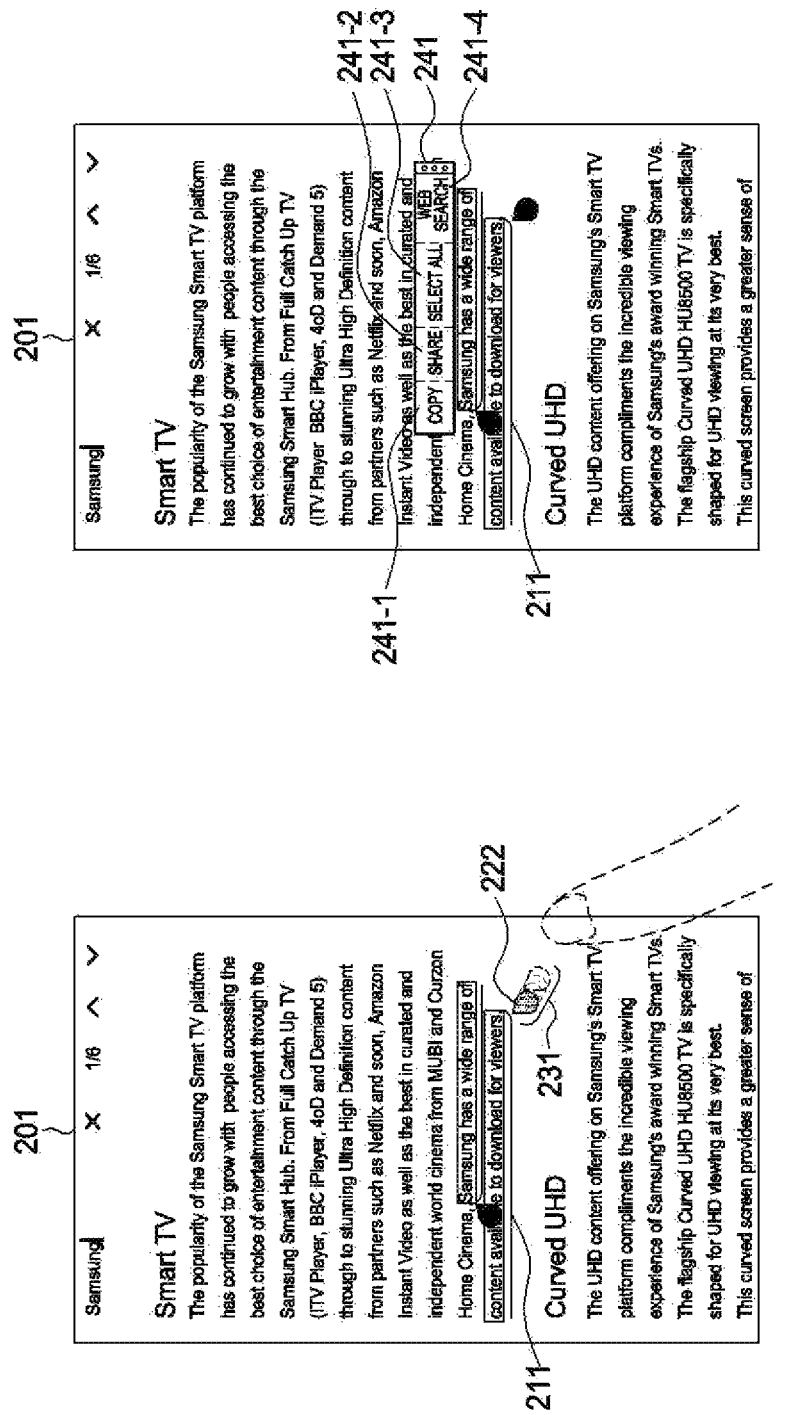

FIGS. 2A and 2B are views illustrating embodiments of using and manipulating a handler, according to an embodiment.

Referring to FIG. 2A(a), an electronic device may highlight and display selected characters 211 as per the user's touch drag to touch and move a handler 222. In this case, while the user touches the screen 201, the electronic device may display the handler 222 independent from the highlighted area with respect to the position of the touch.

Next, the user may make a touch drag so that the touch is a predetermined distance away from the characters 211 while maintaining the touch as illustrated in FIG. 2A(b). In this case, while the user maintains the touch on the screen 201, the electronic device may keep on displaying the highlighted area with respect to the characters 211. The electronic device may display the handler 222 with respect to the position of touch which is the predetermined distance away from the characters 211.

Next, the user may release the touch from the screen 201 as illustrated in FIG. 2B(c).

When the user releases the touch, the electronic device may move and display the handler 222 so that the handler 222 is positioned adjacent the highlighted area. During this course, the electronic device may provide a visual effect 231 as the handler 222 moves to the highlighted area. The electronic device may display the handler 222 in a smaller size than before the touch is released (e.g., while the touch is made). In other words, when the handler 222 is touched, the electronic device may display the handler 222 in a larger size, and when the touch on the handler 222 is released, the electronic device may display the handler 222 in a smaller size. This allows the user to easily grasp the circumstance in which the touch is being touched, providing the user with better manipulation.

When the user releases the touch, the electronic device may display a menu 241, which enables use of the selected characters 211, adjacent the highlighted areas illustrated in FIG. 2B(d). The menu 241 may include at least one of a copy item 241-1 enabling copying the selected characters 211, a share item 241-2 enabling sharing the selected characters 211 with an external device, a select item 241-3 enabling selecting all the characters on a document (e.g., a webpage) containing the characters 211, and a web search item 241-4 enabling a web search using the selected characters 211 as a keyword.

Figure 3A:
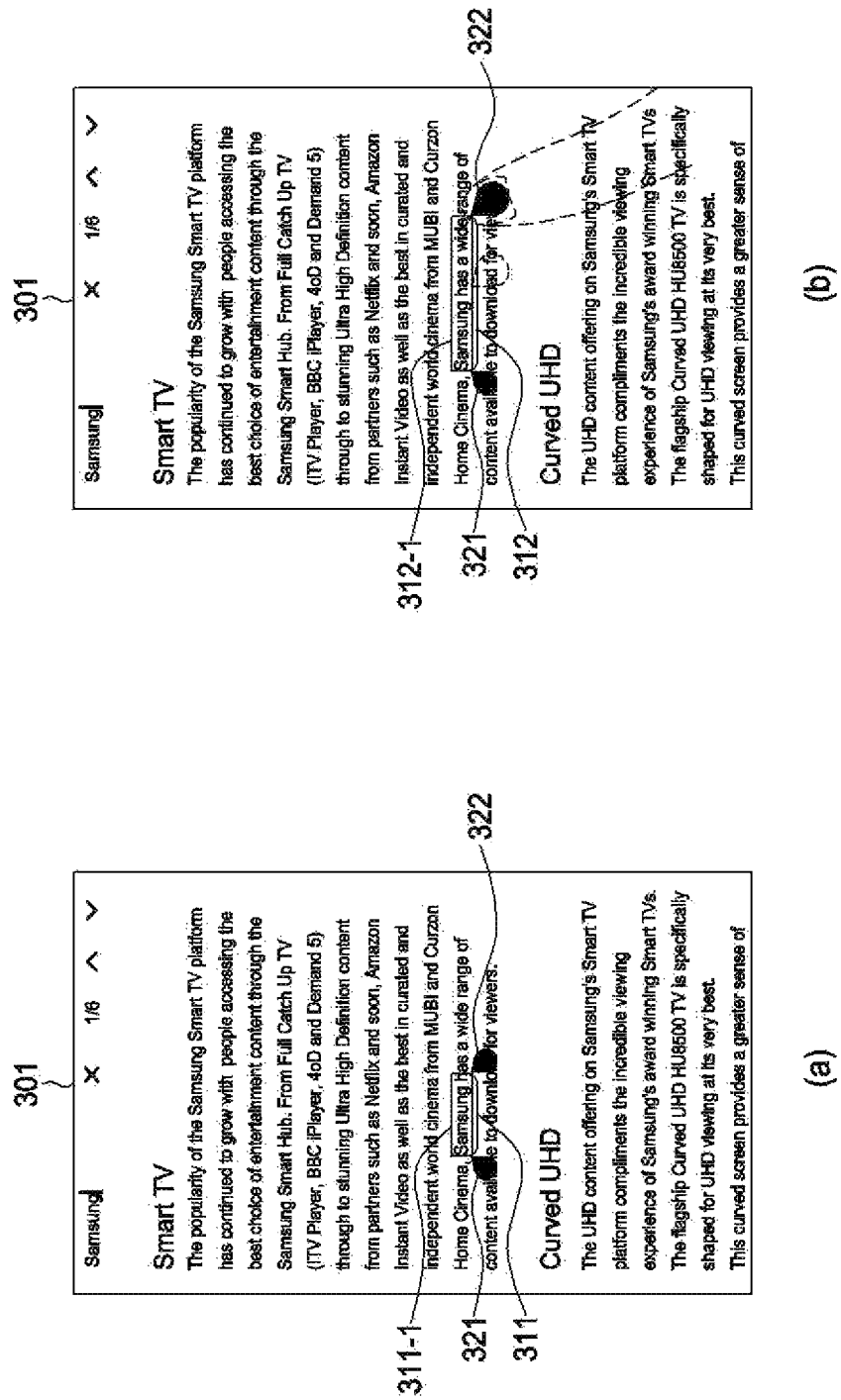
Figure 3B:
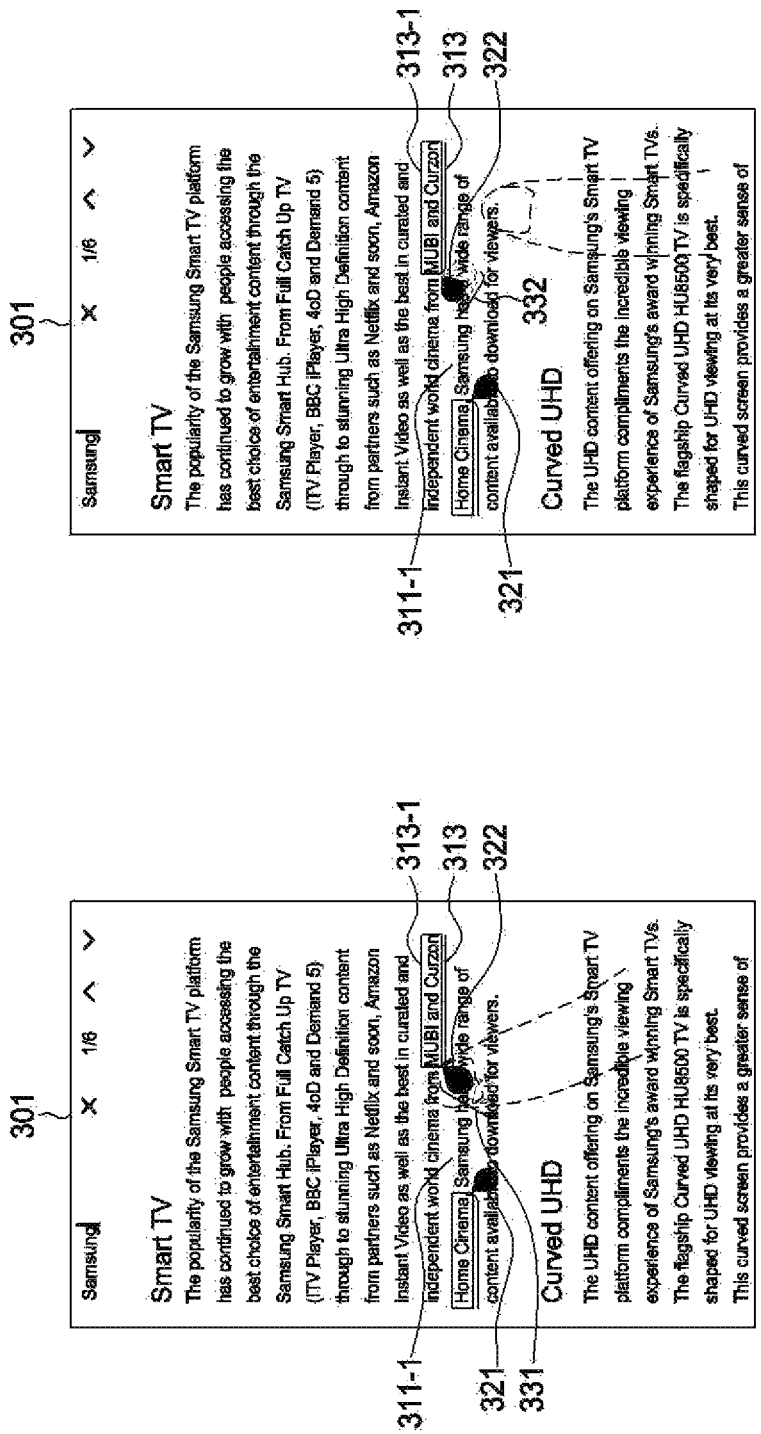

FIGS. 3A and 3B are views illustrating embodiments of using and manipulating a handler, according to an embodiment.

Referring to FIG. 3A(a), an electronic device may display highlighted characters 311 on a screen 301. In this case, the electronic device may display a first handler 321 and a second handler 322 adjacent a highlighted area 311-1.

The first handler 321 and the second handler 322 each may have directivity. Each of the first handler 321 and the second handler 322 may be displayed inclined towards the highlighted area 311-1. Specifically, the first handler 321 may be positioned adjacent and inclined towards the head of the highlighted area 311-1 to indicate the start of the highlighted area 311-1. The second handler 322 may be positioned adjacent and inclined towards the tail of the highlighted area 311-1 to indicate the end of the highlighted area 311-1. In this context, the user may make a touch drag to touch and move the second handler 322 indicating the end.

The user may perform a touch drag input so that the second handler 322 indicating the end is not positioned ahead of the first handler 321 indicating the start as illustrated in FIG. 3A(b).

While the user, who performs the touch drag, keeps touching the screen 301, the electronic device may display the first handler 321 and the second handler 322 while the first handler 321 and the second handler 322 maintain the same directivity as illustrated in FIG. 3A(b). Specifically, the first handler 321 may be positioned adjacent and inclined towards the head of the highlighted area 312-1, where the newly selected characters 312 are highlighted, to indicate the start of the highlighted area 312-1. The second handler 322 may be positioned adjacent and inclined towards the tail of the highlighted area 312-1 to indicate the end of the highlighted area 312-1. Meanwhile, the second handler 322 which the user is touching may be displayed in a larger size while the user's touch is maintained than before the user touches.

The user may perform a touch drag input so that the second handler 322 indicating the end is positioned ahead of the first handler 321 indicating the start as illustrated in FIG. 3B(c-1) and (c-2). While the user, who performs the touch drag, keeps touching the screen 301, the electronic device may display the first handler 321 and the second handler 322 in opposite directions to their existing ones. The second handler 322 may be positioned adjacent and inclined towards the head of the highlighted area 313-1, where the newly selected characters 313 are highlighted, to indicate the start of the highlighted area 313-1.

In this case, the electronic device may redirect the second handler 322 while performing the touch drag input as illustrated in FIG. 3B(c-1). During this course, the electronic device may display a visual effect 331 as per the redirecting of the second handler 322.

When the touch drag input is performed and the user's touch is released, the electronic device may redirect the second handler 322 as illustrated in FIG. 3B(c-2). During this course, the electronic device may display a visual effect 332 as per the redirecting of the second handler 322.

Figure 4A:
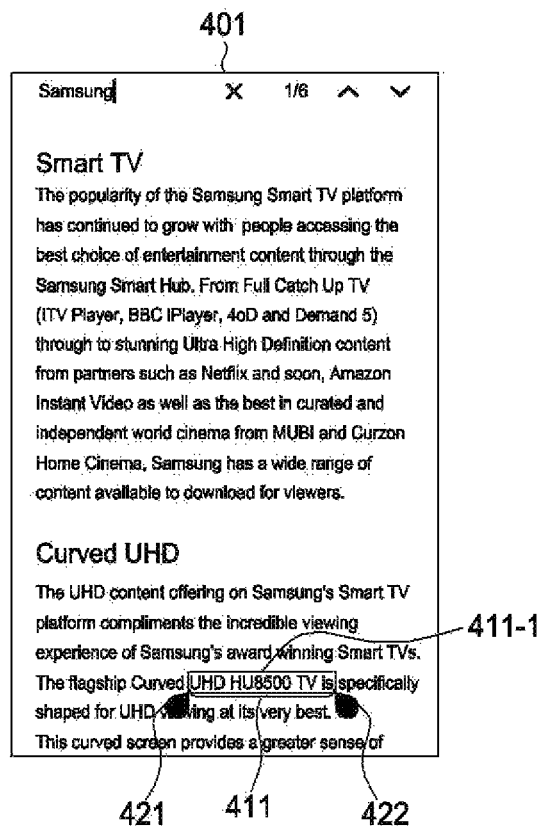
Figure 4B:
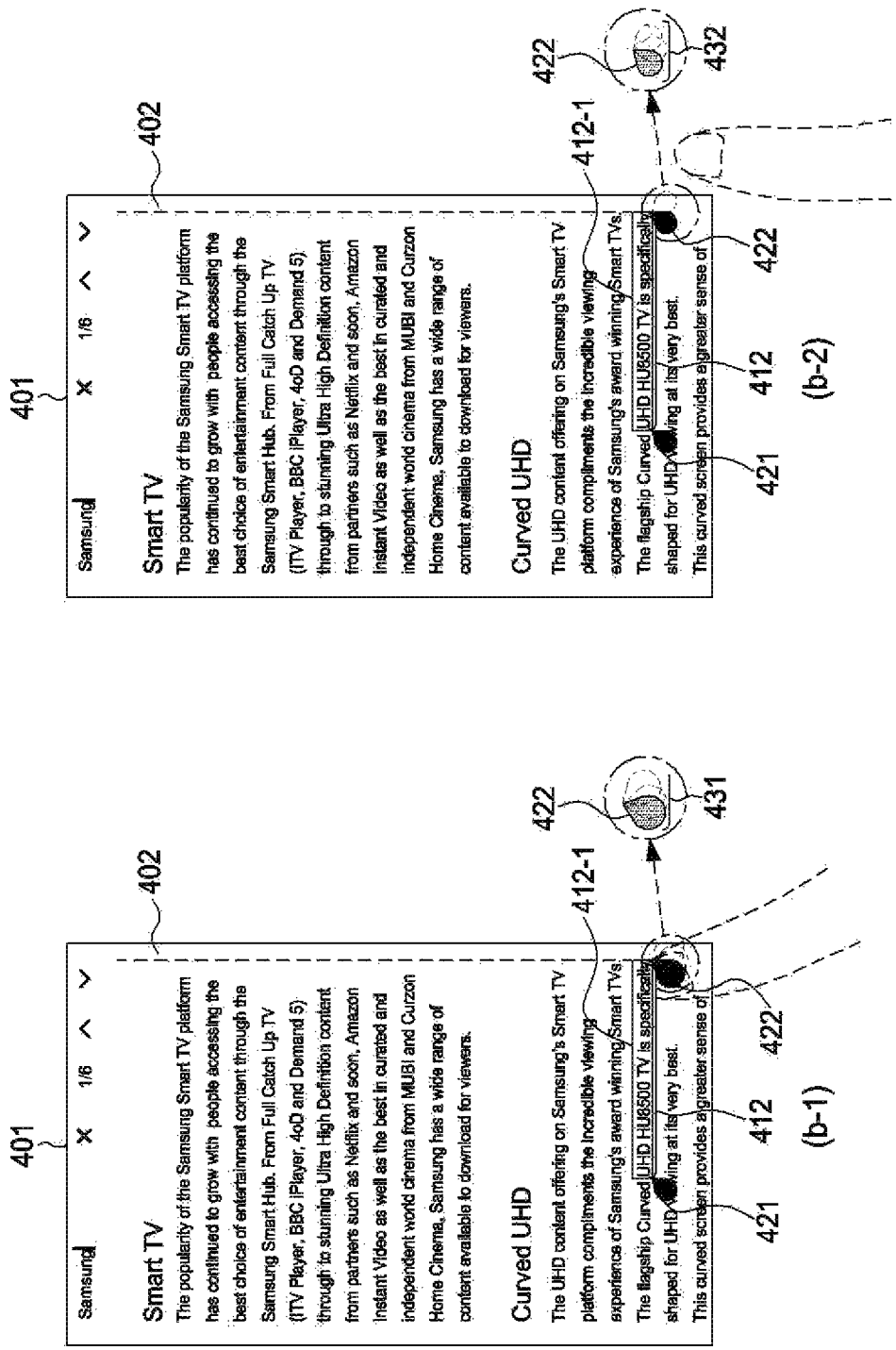

FIGS. 4A and 4B are views illustrating embodiments of using and manipulating a handler, according to an embodiment.

Referring to FIG. 4A(a), an electronic device may display highlighted characters 411 on a screen 401. Further, the electronic device may display a first handler 421 and a second handler 422 adjacent a highlighted area 411-1. In this case, the first handler 421 and the second handler 422 each may have directivity as illustrated in FIG. 3A. For example, the first handler 421 and the second handler 422 each may be tilted towards the highlighted area 411-1. In this situation, the electronic device may receive a touch drag input from the user to touch and move the second handler 422. Accordingly, the electronic device may highlight the selected characters 412 as illustrated in FIG. 4B(b-1) and FIG. 4B(b-2).

In this case, such an event may arise where the position of the user's touch or the second handler 322 enters an edge area 402 while the user's touch as per the touch drag is maintained as illustrated in FIG. 4B(b-1). Upon determining that the position of touch or the second handler 422 has entered the edge area 402, the electronic device may redirect the second handler 422. In other words, when the second handler 422 is partially cut off the screen 401 as per entry of the second handler 422 into the edge area 402, the second handler 422 may be difficult for the user to touch. Accordingly, the electronic device may turn the second handler 422 to face the side of the screen and display the second handler 422 to enable the user to easily touch the second handler 422. At this time, the electronic device may display a visual effect 431 while the second handler 422 redirects. While the user's touch on the second handler 422 is maintained, the second handler 422 may be displayed in a larger size than before the touch.

The user may perform a touch drag and release the touch as illustrated in FIG. 4B(b-2). In this case, the position where the touch has been released or the position of the second handler 422 when the touch is released may be positioned in the edge area 402. Upon determining that the position of touch or the second handler 422 has entered the edge area 402, the electronic device may redirect the second handler 422. At this time, the electronic device may display a visual effect 432 while the second handler 422 redirects. While the user's touch on the second handler 422 is released, the second handler 422 may be displayed in a smaller size than when touched. As such, the user may be allowed better manipulation on the handler by redirecting the handler when the second handler 422 is located in the edge area 402.

Figure 5:
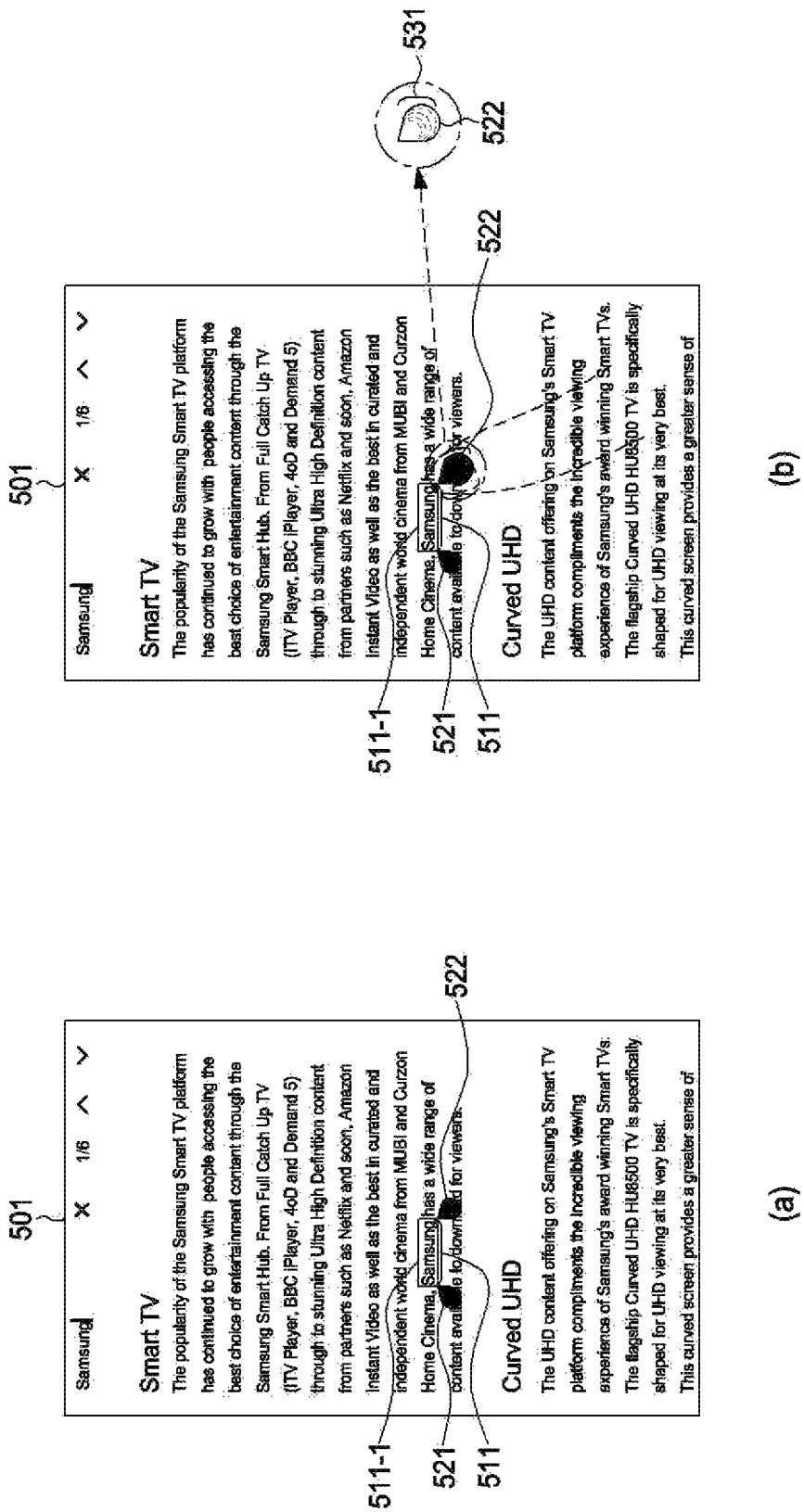

FIG. 5 is a view illustrating an embodiment of using and manipulating a handler, according to an embodiment.

Referring to FIG. 5(*a*), an electronic device may display highlighted characters 511 on a screen 501. Further, the electronic device may display a first handler 521 and a second handler 522 adjacent a highlighted area 511-1. The electronic device may receive a touch input from the user who touches the second handler 522 in order to touch and move the second handler 522. In this case, the electronic device may display the second handler 522 in a larger size than before the user's touch as illustrated in FIG. 5(*b*). The electronic device may provide a visual effect 531 as the second handler 522 enlarges. Upon receipt of the user's input to release the touch on the second handler 522, the electronic device may provide a visual effect as the second handler 522 shrinks. As the handler is resized as per the user's touch, the user may easily grasp whether a handler is chosen and the position of the handler.

Figure 6A:
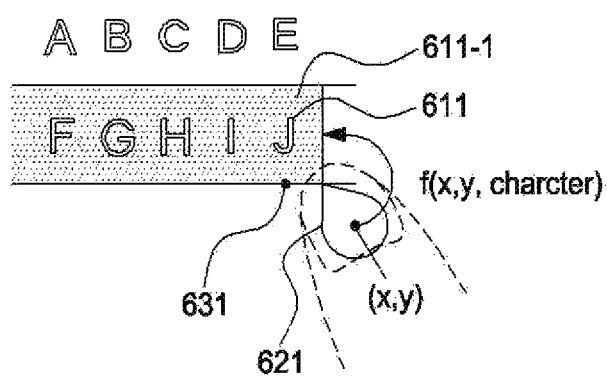
FIGS. 6A, 6B, and 6C are views illustrating an example of using and manipulating a handler given an offset, according to an embodiment.
Figure 6B:
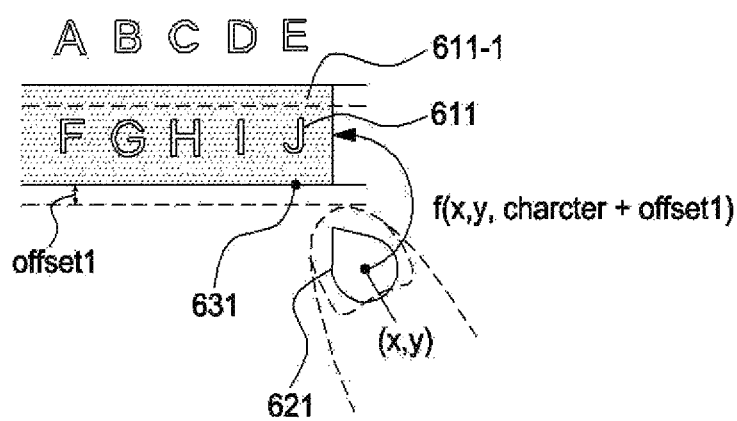
Figure 6C:
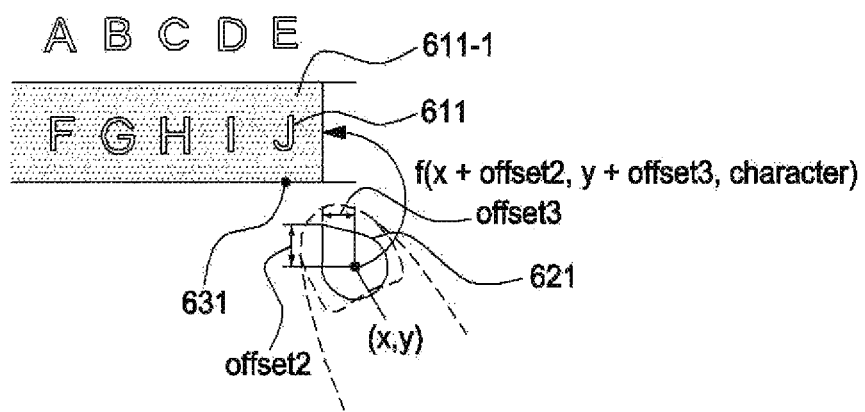

FIGS. 6A, 6B, and 6C are views illustrating an embodiment of using and manipulating a handler given an offset, according to an embodiment.

Referring to FIG. 6A to 6C, the electronic device may display a handler 621 with respect to a touch position (x,y), and highlight and display an area 611-1 regarding a character 611 corresponding to the touch position (x,y).

As illustrated in FIG. 6A, when the touch position (x,y) is determined, the electronic device may determine the highlighted area 611-1 via a function f (x,y,char) operation using the touch position (x,y) and the attribute of the character 611 as inputs. Here, "char" is a value regarding the attribute of the character 611 corresponding to the touch position (x,y), which may include at least one of, e.g., the position (e.g., a reference point 631 of the character 611), size, and thickness of the character 611.

The electronic device may apply an offset to the position of the character 611 as illustrated in FIG. 6B. In this case, when the touch position (x,y) is determined, the electronic device may determine the highlighted area 611-1 via a function f(x,y,char+offset1) operation using the touch position (x,y) and the attribute of the character 611 as inputs. Here, "char+offset1" represents a result of applying an offset (e.g., offset1) to the position (e.g., the reference point 631 of the character 611) of the character 611. The offset (e.g., offset1) may be, but is not limited to, a value from 30 pixels to 40 pixels.

The electronic device may apply an offset to the touch position (x,y) as illustrated in FIG. 6C. In this case, when the touch position (x,y) is determined, the electronic device may determine the highlighted area 611-1 via a function f(x+offset2,y+offset3,char) operation using the touch position (x,y) and the attribute of the character 611 as inputs. Here, "x+offset2" and "y+offset3" represent the results of applying offsets (e.g., offset2, and offset3) to the touch position (x,y). As such, manipulating the handler 621 with an offset applied thereto enables the characters to be hidden in a minimal range when the user manipulates the handler. In other words, the user may easily choose characters using a handler 621.

Figure 7:
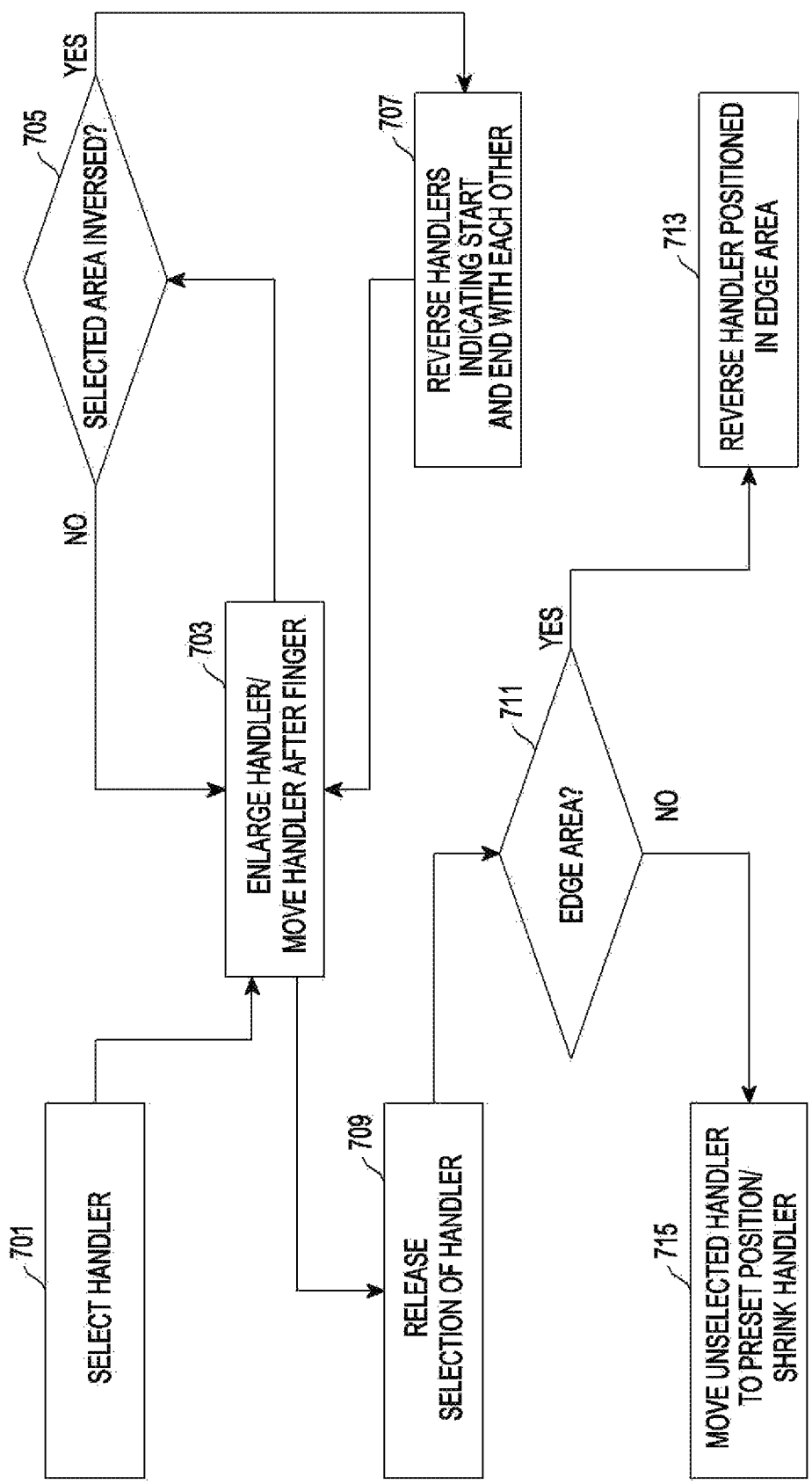
FIGS. 7 and 8 are flowcharts illustrating examples of displaying a handler by an electronic device, according to an embodiment.

FIG. 7 is a flowchart illustrating an embodiment of displaying a handler on an electronic device, according to an embodiment.

In operation 701, the user may select a handler. For example, the user may choose a handler by touching the handler.

When the handler is selected, the electronic device may enlarge the handler in operation 703. The electronic device may move the handler along with the user's finger as per the user's touch drag. In this situation, the electronic device may determine whether the area where the user selects the characters is inversed in operation 705. For example, as illustrated in FIGS. 3A and 3B, the electronic device may determine whether the user's touch drag input is performed so that a handler indicating the end of the selected characters is positioned ahead of a handler indicating the start of the selected characters. Otherwise, the electronic device may determine whether the user's touch drag input is performed so that the handler indicating the start of the selected characters is positioned behind the handler indicating the end of the selected characters.

Upon determining that the selected area is inversed, the electronic device may reverse the directions of the handlers indicating the start and end of the characters in operation 707. For example, as illustrated in FIGS. 3A and 3B, while the user keeps touching the screen, the electronic device may turn the plurality of handlers in opposite directions to their existing ones and display the handlers.

The user may also release the selection of the handler in operation 709. For example, the user may release the selection of the handler by taking the touch off the handler.

When the selection of the handler is released, the electronic device may determine whether the area where the selection of the handler is released is an edge area in operation 711. For example, as illustrated in FIGS. 4A and 4B, the electronic device may determine whether the position where the touch on the handler is released or the position of the handler when the touch is released is the edge area.

When the area where the selection of the handler is released is the edge area, the electronic device may reverse the handler which is positioned in the edge area in operation 713. For example, as illustrated in FIGS. 4A and 4B, the electronic device may redirect the handler positioned in the edge area and display the handler.

Unless the area where the selection of the handler is released is the edge area, the electronic device may move the selection-released handler to a preset position in operation 715. For example, as illustrated in FIG. 2A(b), the electronic device may display the handler adjacent to the highlighted area of the characters. The electronic device may shrink the handler as the selection of the handler is released.

Figure 8:
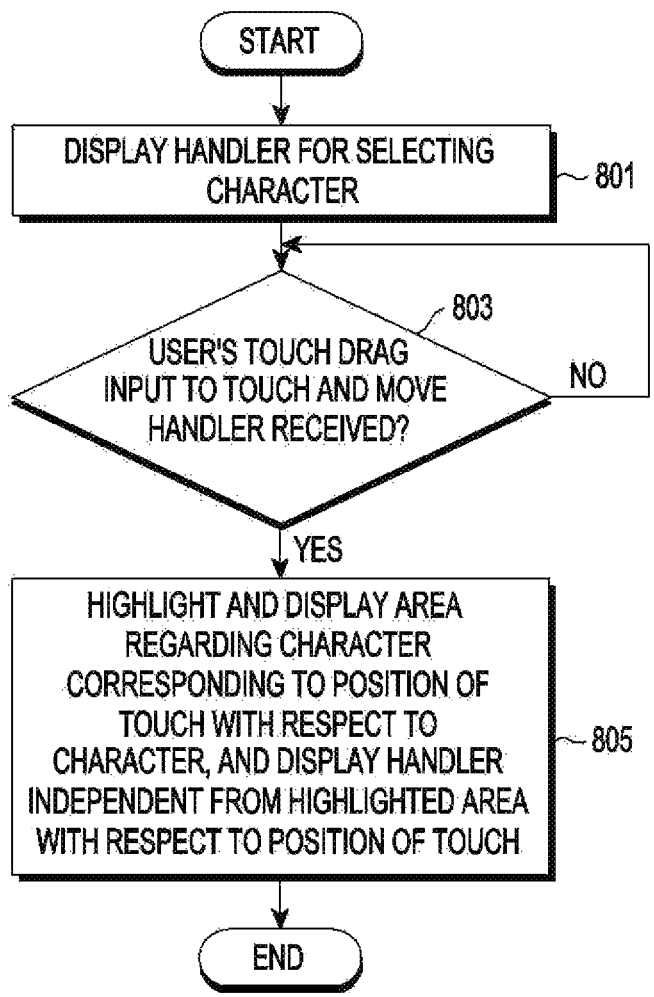

FIG. 8 is a flowchart illustrating an embodiment of displaying a handler on an electronic device, according to an embodiment.

In operation 801, the electronic device may display a handler for selecting a character on the screen of the electronic device.

In operation 803, the electronic device may determine whether a touch drag input is received from the user to touch and move the handler.

Upon receipt of the user's touch drag input, the electronic device may highlight and display an area regarding the character with respect to the character corresponding to the position of touch and display the handler independent from the highlighted area with respect to the position of touch. For example, while the user touches the handler, the electronic device may highlight and display an area regarding the character with respect to the character corresponding to the position of touch and display the handler independent from the highlighted area with respect to the position of touch in operation 805. In operation 803, if the user's touch drag input to touch and move the handler is not received, operation 803 may be repeated.

Specifically, upon displaying the highlighted area for the character with respect to the character, the electronic device may display the highlighted area from the character and its next character. Upon displaying the handler independent from the highlighted area with respect to the position of touch, the electronic device may display an indicator for the handler within the width of the character.

According to an embodiment, where the user releases the touch on the handler, the electronic device may move and display the handler to be positioned adjacent the highlighted area.

According to an embodiment, when the user performs the touch drag to be positioned greater than or equal to a predetermined distance away from the character while maintaining the touch on the handler, the electronic device may keep on highlighting and displaying the area regarding the character with respect to the character and display the handler independent from the highlighted area with respect to the position of the touch which is positioned away by greater than or equal to the predetermined distance.

According to an embodiment, where the position of the user's touch or the handler is positioned in an edge area, the electronic device may display the handler to face a side surface of the screen.

According to an embodiment, upon highlighting and displaying the area regarding the character with respect to the character corresponding to the position of the touch, the electronic device may apply an offset to at least one of the position of the touch and the position of the character and highlight and display the area regarding the character with respect to the character corresponding to the position of the touch.

According to an embodiment, while the handler is touched, the electronic device may display the handler in a larger size than before the handler is touched. When the touch on the handler is released, the electronic device may display the handler in a smaller size than when the handler is touched.

According to an embodiment, when the touch on the handler is released, the electronic device may display a menu enabling use of the highlighted character. In this case, the menu may include at least one of a copy item enabling copying the character, a share item enabling sharing the character with an external device, and a web search item enabling a web search using the character as a keyword.

According to an embodiment, the handler may be displayed as an image or video, instead of the character.

A handler enabling selection of an image or video may be displayed on the screen. In this case, upon receipt of the user's touch drag input to touch and move the handler, the electronic device may, while the user touches the handler, highlight and display an area regarding an image or video corresponding to the position of the touch with respect to the image or video and display the handler independent from the highlighted area with respect to the position of the touch.

Figure 9:
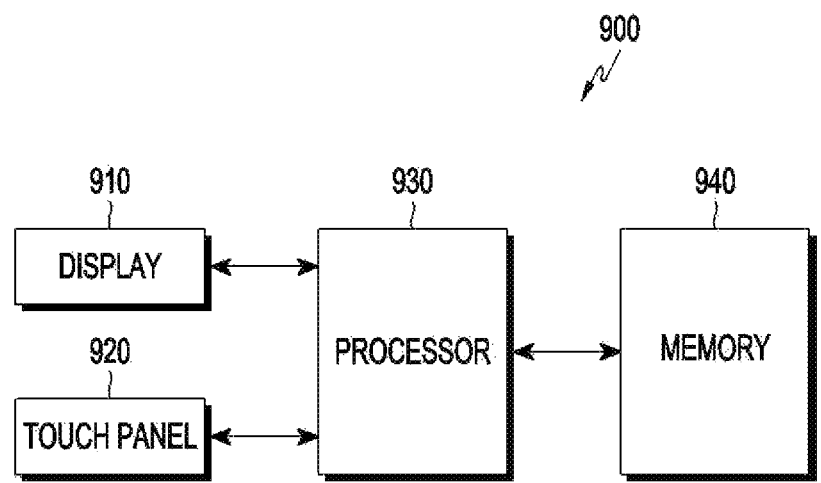
FIG. 9 is a block diagram illustrating an electronic device, according to an embodiment.

FIG. 9 is a block diagram illustrating an electronic device, according to an embodiment.

Referring to FIG. 9, an electronic device 900 may include a display 910, a touch panel 920, a processor 930, and a memory 940.

The display 910 may provide a screen on which visual information is displayed. The screen may mean an area exposed through an opening of the housing of the electronic device 900 to allow the user to view, as part of the display 910. The touch panel 920 may detect the user's touch drag input on the screen. The touch drag input may mean the user's input of touching and then dragging on the screen. At this time, the user's touch on the screen may include a proximity touch. Where various types of protective layers (e.g., films) are stacked on the display 910, touching the layers may also be deemed as touching the screen. Touching the display 910 or the layer while the user's finger does not contact, but is rather a predetermined distance away from, the display 910 or layer may also be taken as touching the screen. The processor 930 is electrically connected with the display 910 and the touch panel 920 to control the overall operation of the electronic device 900.

The processor 930 may control the display 910 to display a handler for selecting a character on the screen. While the handler is touched by the user's touch drag to touch and move the handler, the processor 930 may control the display to highlight and display an area regarding the character with respect to the character corresponding to the position of touch and display the handler independent from the highlighted area with respect to the position of touch. The memory 940 may store commands necessary to enable the processor 930 to control the electronic device. The memory 940 may store commands that enable the processor 930 to control the display 910 to display a handler for selecting a character on the screen and to control the display to, while the handler is touched by the user's touch drag to touch and move the handler, highlight and display an area regarding the character with respect to the character corresponding to the position of touch and display the handler independent from the highlighted area with respect to the position of touch.

The memory 940 may store commands to enable the processor 930 to, when the user releases the touch on the handler, control the display 910 to move and display the handler to be positioned adjacent the highlighted area.

The memory 940 may store commands to enable the processor 930 to control the display 910 to highlight and display the area regarding the character from the character and a character next to the character.

The memory 940 may store commands to enable the processor 930 to control the display 910 to display an indicator for the handler within a width of the character and independent from the highlighted area.

The memory 940 may store commands to enable the processor 930 to, when the user performs the touch drag input a predetermined distance or more away from the character while maintaining the touch on the handler, control the display 910 to, while the user touches the handler, keep on highlighting and displaying the area regarding the character with respect to the character and display the handler independent from the highlighted area with respect to a position of the touch which is positioned away by greater than or equal to the predetermined distance.

The memory 940 may store commands to enable the processor 930 to, when the position of the touch or the handler is positioned in an edge area, control the display 910 to display the handler towards a side surface of the screen.

The memory 940 may store commands to enable the processor 930 to apply an offset to at least one of the position of the touch and a position of the character and control the display 910 to highlight and display the area regarding a character corresponding to the position of the touch with respect to the character.

The memory 940 may store commands to enable the processor 930 to, while the handler is touched, control the display 910 to display the handler in a larger size than before the handler is touched, and when the touch on the handler is released, control the display to display the handler in a smaller size than when the handler is touched.

Figure 10:
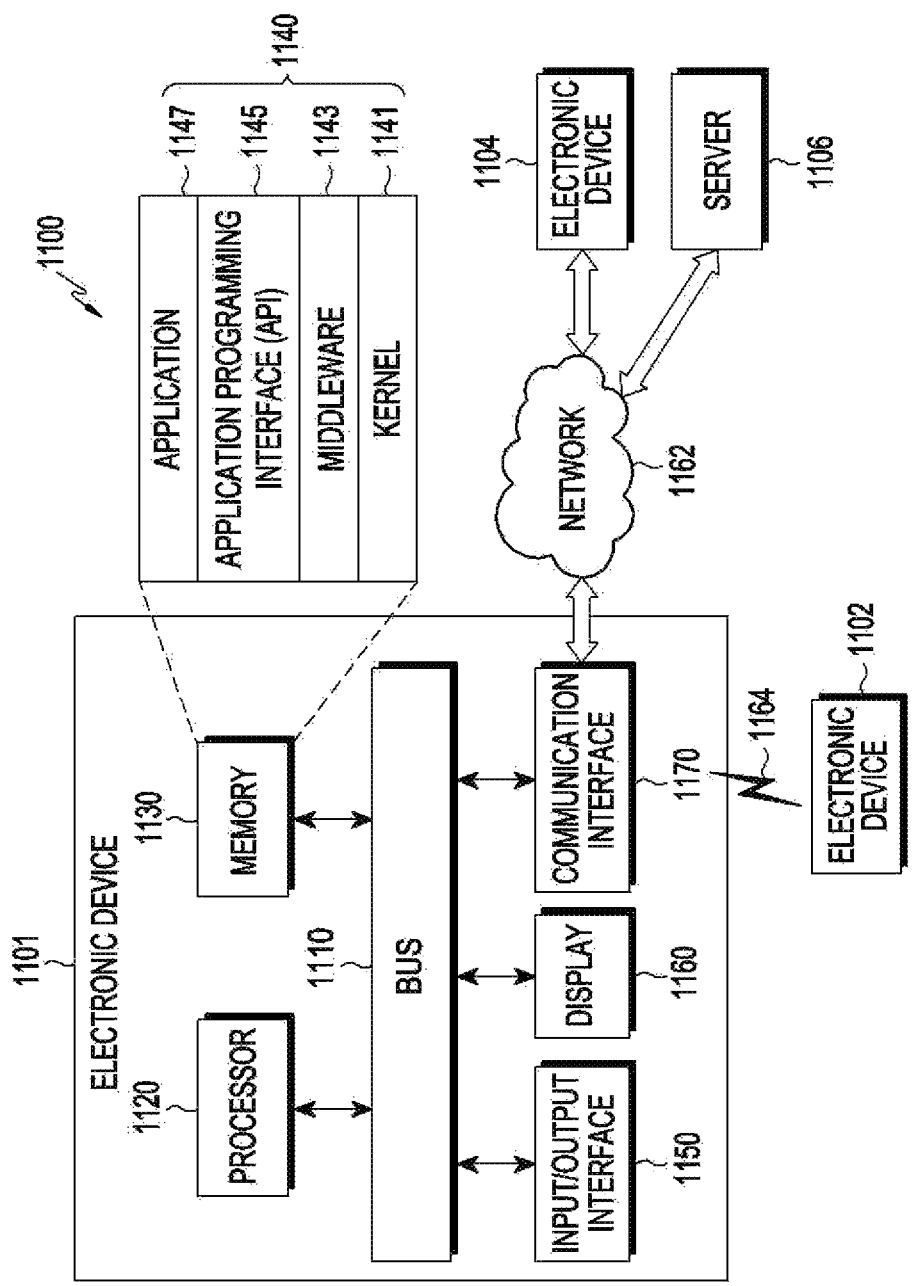
FIG. 10 is a view illustrating an electronic device in a network environment, according to an embodiment.

FIG. 10 is a view illustrating an electronic device 1101 in a network environment 1100, according to an embodiment. Referring to FIG. 10, an electronic device 1101 in a network environment 100 may communicate with an electronic device 1102 via a first network 1164 (e.g., a short-range wireless communication network), or an electronic device 1104 or a server 1106 via a second network 1162 (e.g., a long-range wireless communication network). The electronic device 1101 may communicate with the electronic device 1104 via the server 1106. The electronic device 1101 may include a bus 1110, a processor 1120, a memory 1130, an input/output interface 1150, a display 1160, and a communication interface 1170. The electronic device 1101 may exclude at least one of the components or may add another component.

The bus 1110 may include a circuit for connecting the components 1120 to 1170 with one another and transferring communications (e.g., control messages or data) between the components.

The processor 1120 may include one or more of a CPU, an AP, or a communication processor (CP). The processor 1120 may perform control on at least one of the other components of the electronic device 1101 or perform an operation or data processing relating to communication.

The memory 1130 may include a volatile or non-volatile memory. The memory 1130 may store commands or data related to at least one other component of the electronic device 1101. The memory 1130 may store software or a program 1140. The program 1140 may include, e.g., a kernel 1141, middleware 1143, an application programming interface (API) 1145, or an application 1147. At least a portion of the kernel 1141, middleware 1143, or API 1145 may be referred to as an operating system (OS). The kernel 1141 may control or manage system resources (e.g., the bus 1110, processor 1120, or a memory 1130) used to perform operations or functions implemented in other programs (e.g., the middleware 1143, API 1145, or application 1147). The kernel 1141 may provide an interface that allows the middleware 1143, the API 1145, or the application 1147 to access the individual components of the electronic device 1101 to control or manage the system resources.

The middleware 1143 may function as a relay to allow the API 1145 or the application 1147 to communicate data with the kernel 1141, for example. Further, the middleware 1143 may process one or more task requests received from the application program 1147 in order of priority. The middleware 1143 may assign a priority of using system resources (e.g., bus 1110, processor 1120, or memory 1130) of the electronic device 1101 to at least one of the application 1147, and process one or more task requests.

The API 1145 is an interface allowing the application 1147 to control functions provided from the kernel 1141 or the middleware 1143. The API 133 may include at least one interface or function (e.g., a command) for filing control, window control, image processing, or text control.

The input/output interface 1150 may transfer commands or data input from the user or other external device to other component(s) of the electronic device 1101 or may output commands or data received from other component(s) of the electronic device 1101 to the user or other external devices.

The display 1160 may include a liquid crystal display (LCD), a light emitting diode (LED) display, an organic light emitting diode (OLED) display, or a micro electro mechanical systems (MEMS) display, or an electronic paper display. The display 1160 may display various contents (e.g., text, images, videos, icons, or symbols) to the user. The display 1160 may include a touchscreen and may receive, e.g., a touch, a gesture, or a proximity or a hovering input using an electronic pen or a body portion of the user.

The communication interface 1170 may set up communication between the electronic device 1101 and an external electronic device (e.g., a first electronic device 1102, a second electronic device 1104, or a server 1106). The communication interface 1170 may be connected with the second network 1162 through wireless or wired communication to communicate with the external electronic device (e.g., the second external electronic device 1104 or server 1106).

The wireless communication may include cellular communication which uses long term evolution (LTE), long term evolution advanced (LTE-A), code division multiple access (CDMA), wideband code division multiple access (WCDMA), universal mobile telecommunication system (UMTS), wireless broadband (WiBro), or global system for mobile communication (GSM). According to an embodiment, the wireless communication may include wireless-fidelity (Wi-Fi), light-fidelity (Li-Fi), Bluetooth™, Bluetooth low power (BLE), zigbee, near-field communication (NFC), magnetic secure transmission (MST), radio frequency (RF), or body area network (BAN) as denoted as first network 1164. The wired connection may include universal serial bus (USB), high definition multimedia interface (HDMI), recommended standard (RS)-232, power line communication (PLC), or plain old telephone service (POTS). The second network 1162 may include telecommunication networks a computer network (e.g., local area network (LAN) or wide area network (WAN)), Internet, or a telephone network.

The first and second external electronic devices 1102 and 1104 each may be a device of the same or a different type from the electronic device 1101. According to an embodiment, all or some of operations executed on the electronic device 1101 may be executed on another or multiple other electronic devices (e.g., the electronic devices 102 and 104, or server 1106). When the electronic device 1101 should perform some function or service automatically or at a request, the electronic device 1101, instead of executing the function or service on its own or additionally, may request another device to perform at least some functions associated therewith. The other electronic device may execute the requested functions or additional functions and transfer a result of the execution to the electronic device 1101. The electronic device 1101 may provide a requested function or service by processing the received result as it is or additionally. To that end, a cloud computing, distributed computing, or client-server computing technology may be used.

Figure 11:
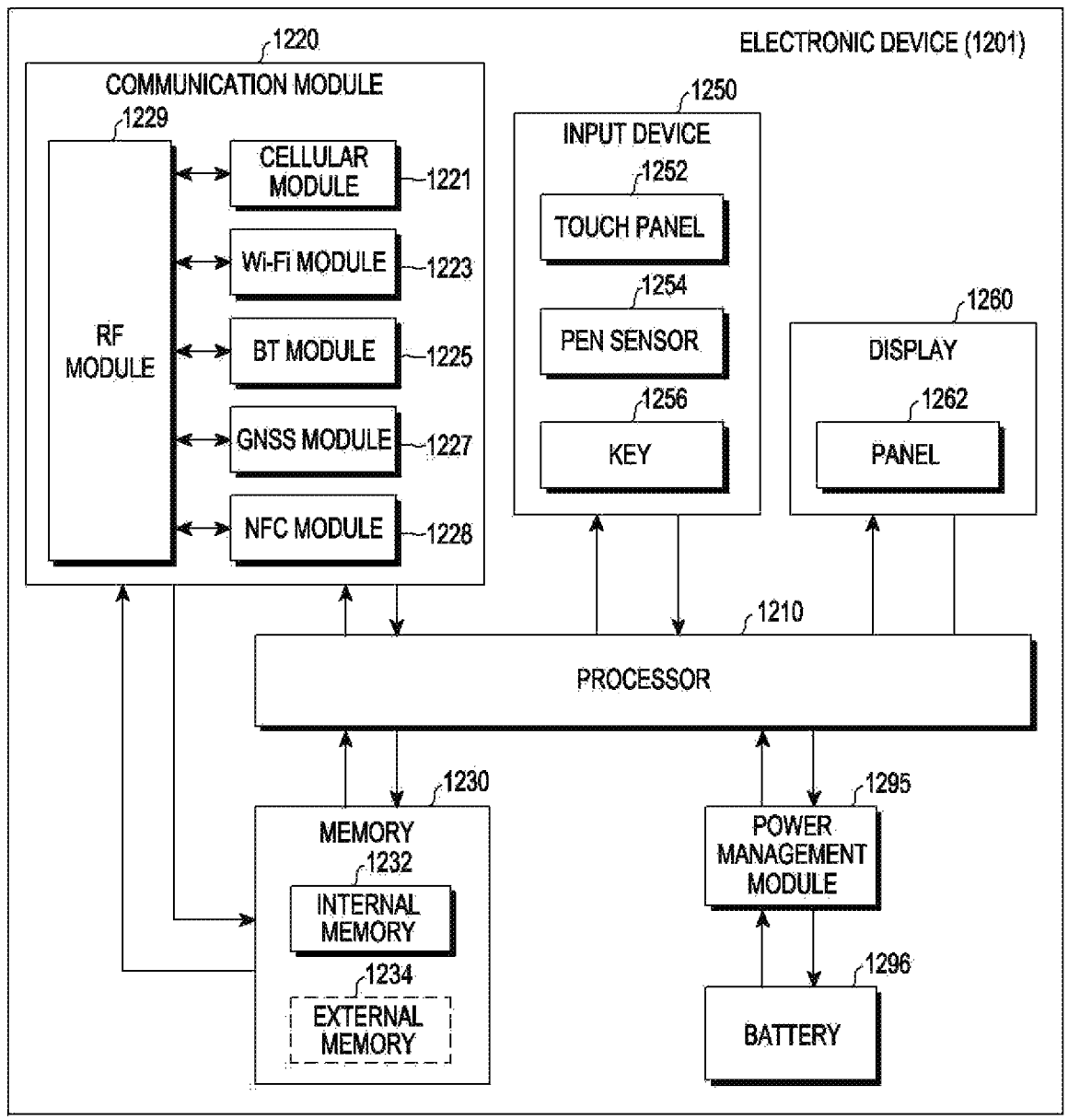
FIG. 11 is a block diagram illustrating an electronic device according to an embodiment.

FIG. 11 is a block diagram illustrating an electronic device according to an embodiment.

An electronic device 1201 may include the whole or part of the electronic device 1101. The electronic device 1201 may include one or more processors 1210 (e.g., an AP), a communication module 1220, a memory 1230, an input device 1250, a display 1260, a power management module 1295, and a battery 1296. The processor 1210 may control multiple hardware and software components connected to the processor 1210 by running an operating system or application programs, and the processor 1210 may process and compute various data. The processor 1210 may be implemented in a system on chip (SoC). According to an embodiment, the processor 1210 may further include a graphic processing unit (GPU) or an image signal processor (ISP). The processor 1210 may include at least some (e.g., the cellular module 1221) of the components of electronic device 1101. The processor 1210 may load a command or data received from at least one of other components (e.g., a non-volatile memory) on a volatile memory, process the command or data, and store the resultant data in the non-volatile memory.

The communication module 1220 may have the same or similar configuration to the communication interface 1170. The communication module 1220 may include a cellular module 1221, a Wi-Fi module 1223, a bluetooth (BT) module 1225, a GNSS module 1227, a NFC module 1228, and a RF module 1229. The cellular module 1221 may provide voice call, video call, text, or Internet services through a communication network. According to an embodiment, the cellular module 1221 may perform at least some of the functions providable by the processor 1210. The cellular module 1221 may include a CP. At least some (e.g., two or more) of the cellular module 1221, the Wi-Fi module 1223, the BT module 1225, the GNSS module 1227, or the NFC module 1228 may be included in a single integrated circuit (IC) or an IC package. The RF module 1229 may communicate data, e.g., communication signals (e.g., RF signals). The RF module 1229 may include a transceiver, a power amp module (PAM), a frequency filter, a low noise amplifier (LNA), or an antenna. At least one of the cellular module 1221, the Wi-Fi module 1223, the BT module 1225, the GNSS module 1227, or the NFC module 1228 may communicate RF signals through a separate RF module.

The memory 1230 may include an internal memory 1232 or an external memory 1234. The internal memory 1232 may include a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 1234 may include a flash drive, e.g., a compact flash (CF) memory, a secure digital (SD) memory, a micro-SD memory, a mini-SD memory, an extreme digital (xD) memory, a multi-media card (MMC), or a memory stick. The external memory 1234 may be functionally or physically connected with the electronic device 1201 via various interfaces.

The input device 1250 may include a touch panel 1252, a (digital) pen sensor 1254, and a key 1256. The touch panel 1252 may use at least one of a capacitive, a resistive, an infrared, or an ultrasonic method. The touch panel 1252 may further include a control circuit. The touch panel 1252 may further include a tactile layer and may provide a user with a tactile reaction. The (digital) pen sensor 1254 may include, e.g., a part of a touch panel or a separate sheet for recognition. The key 1256 may include e.g., a physical button, optical key or key pad.

The display 1260 may include a panel 1262 and a control circuit for controlling the same. The panel 1262 may be implemented to be flexible, transparent, or wearable. The panel 1262, together with the touch panel 1252, may be configured in one or more modules. According to an embodiment, the panel 1262 may include a pressure sensor (or force sensor) that may measure the strength of a pressure by the user's touch. The pressure sensor may be implemented in a single body with the touch panel 1252 or may be implemented in one or more sensors separate from the touch panel 1252.

The power manager module 1295 may manage power of the electronic device 1201. According to an embodiment, the power manager module 1295 may include a power management integrated circuit (PMIC), a charger IC, or a battery gauge. The PMIC may have a wired or wireless recharging scheme. The wireless charging scheme may include a magnetic resonance scheme, a magnetic induction scheme, or an electromagnetic wave-based scheme, and an additional circuit, such as a coil loop, a resonance circuit, a rectifier, etc. may be added for wireless charging. The battery gauge may measure an amount of remaining power of the battery 1296, a voltage, a current, or a temperature while the battery 296 is being charged. The battery 1296 may include a rechargeable battery or a solar battery.

Each of the aforementioned components of the electronic device may include one or more parts, and a name of the part may vary with a type of the electronic device. According to various embodiments, the electronic device 1201 may exclude some elements or include more elements, or some of the elements may be combined into a single entity that may perform the same function as by the elements before combined.

The embodiments disclosed herein may be implemented in a software (S/W) program containing commands stored in a computer-readable storage medium.

The computer may be a device that may invoke the stored commands from the storage medium and enable the operations, as per embodiments disclosed herein, according to the invoked commands, and the computer may include an electronic device according to an embodiment.

The computer-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

Methods as per embodiments disclosed herein may be provided in computer program products. The computer program products may be traded as commodities between sellers and buyers.

The computer program products may include S/W programs or computer-readable storage media storing the S/W programs. For example, the computer program products may include S/W program-type products (e.g., downloadable applications (apps)) that are electronically distributed through manufacturers of electronic devices or electronic markets (e.g., Google Play Store™ or App Store™). For electronic distribution, at least part of the S/W programs may be stored in storage media or temporarily generated. In this case, the storage media may be storage media of relay servers that temporarily store the S/W programs, servers of electronic markets, or servers of manufacturers.

According to an embodiment, there may be provided a computer program product comprising a computer-readable recording medium comprising commands enabling the electronic device to display a handler for selecting a character on a screen of the electronic device, receive a user's touch drag input to touch and move the handler, and while the user touches the handler as per the user's touch drag input, highlight and display an area regarding a character corresponding to a position of the touch with respect to the character and display the handler independent from the highlighted area with respect to the position of the touch.

As is apparent from the foregoing description, according to various embodiments, the handler is displayed with respect to the position of the user's touch. Thus, the handler may smoothly and intuitively be moved as per the user's touch drag.

As the user touches the handler or releases the touch, the handler may be resized to allow the user to easily recognize and manipulate the handler.

As the handler is resized or redirected while the handler is positioned on the edge area of the screen, the user's handler manipulation may be done easily even on the edge area.

The other effects achievable or predictable according to embodiments of the present disclosure are explicitly or implicitly disclosed by the detailed description of embodiments of the present disclosure. In other words, various effects predicted according to embodiments of the present disclosure are disclosed in the following detailed description.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. A method for controlling an electronic device, the method comprising:
   displaying a first handler, a second handler and a plurality of characters on a display of the electronic device, wherein the first handler is displayed to face a first direction and the second handler is displayed to face a second direction different from the first direction;
   displaying a first visual effect on one or more first characters among the plurality of characters based on a position corresponding to the first direction of the first handler and a position corresponding to the second direction of the second handler;
   receiving a drag input for moving the first handler;
   displaying the first handler on a first position touched according to the drag input while the drag input is received;
   based on the first position touched according to the first drag input being less than or equal to a first predetermined distance away from a side of the display, rotating the first handler,
   wherein based on the first handler being rotated, at least a part of the rotated first handler is displayed within an area that is greater than the first predetermined distance away from the side of the display and the rotated first handler is displayed to face the second direction; and
   displaying a second visual effect on one or more second characters among the plurality of characters based on a position corresponding to the second direction of the rotated first handler and the position corresponding to the second direction of the second handler.

2. The method of claim 1, further comprising:
based on the drag input being released, moving the first handler to be positioned adjacent to an area where the one or more second characters are displayed.

3. The method of claim 1, further comprising:
displaying an indicator for the rotated first handler within a width of one of the one or more second characters.

4. The method of claim 1, wherein the displaying of the first handler on the first position touched according to the drag input comprises:
   based on the first position touched according to the drag input being greater than or equal to a second predetermined distance away from an area where the one or more first characters are displayed, displaying the first handler on the first position being greater than or equal to the second predetermined distance away from the area where the one or more first characters are displayed while the drag input is received.

5. The method of claim 1, wherein the displaying of the first visual effect on the one or more first characters further comprises:
   applying an offset to at least one of the first position touched according to the drag input or a position of a character among the one or more first characters corresponding to the first position touched according to the drag input.

6. The method of claim 1, wherein while the first handler is touched according to the drag input, the first handler is displayed in a larger size than before being touched, and when the drag input is released, the first handler is displayed in a smaller size than when being touched.

7. The method of claim 1, wherein an area including the one or more first characters comprises at least one of the one or more first characters itself or a background area of the one or more first characters.

8. The method of claim 1, further comprising:
displaying a menu enabling use of the one or more second characters based on the drag input being released,
wherein the menu includes at least one of a copy item for copying the one or more second characters, a share item for sharing the one or more second characters with an external device, or a web search item for a web search using the one or more second characters as a keyword.

9. An electronic device, comprising:
   a display;
   a processor; and
   a memory,
   wherein the memory stores instructions configured to, when executed by the processor, cause the processor to:
      control the display to display a first handler, a second handler and a plurality of characters, wherein the first handler is displayed to face a first direction and the second handler is displayed to face a second direction different from the first direction,
      control the display to display a first visual effect on one or more first characters among the plurality of characters based on a position corresponding to the first direction of the first handler and a position corresponding to the second direction of the second handler,
      receive, by using the display, a drag input for moving the first handler,
      control the display to display the first handler on a first position touched according to the first drag input while the drag input is received,
      based on the first position touched according to the drag input being less than or equal to a first predetermined distance away from a side of the display, rotate the first handler,
      wherein based on the first handler being rotated, at least a part of the rotated first handler is displayed within an area that is greater than the first predetermined distance away from the side of the display, and the rotated first handler is displayed to face the second direction, and control the display to display a second visual effect on one or more second characters among the plurality of characters based on a position corresponding to the second direction of the rotated first handler and the position corresponding to the second direction of the second handler.

10. The electronic device of claim 9, wherein, the memory further stores instructions configured to, when executed by the processor, cause the processor to:

based on the drag input being released, moving the first handler to be positioned adjacent to an area where the one or more second characters are displayed.

11. The electronic device of claim 9, wherein the memory further stores instructions configured to, when executed by the processor, cause the processor to:

control the display to display an indicator for the rotated first handler within a width of one of the one or more second characters.

12. The electronic device of claim 9, wherein the memory further stores instructions configured to, when executed by the processor, cause the processor to:

based on the first position touched according to the drag input being greater than or equal to a second predetermined distance away from an area where the one or more first characters are displayed, control the display to display the first handler on the first position being greater than or equal to the second predetermined distance away from the area where the one or more first characters are displayed while the drag input is received.

13. The electronic device of claim 9, wherein the memory further stores instructions configured to, when executed by the processor, to cause the processor to:

apply an offset to at least one of the first position touched according to the drag input or a position of a character among the one or more first characters corresponding to the first position touched according to the drag input.

14. The electronic device of claim 9, wherein the memory further stores instructions configured to, when executed by the processor, to cause the processor to:

while the first handler is touched according to the drag input, control the display to display the first handler in a larger size than before the first handler is touched, and when the drag input is released, control the display to display the first handler in a smaller size than when the first handler is touched, while the first handler is being touched.

15. The electronic device of claim 9, wherein an area including the one or more first characters comprises at least one of the one or more first characters itself or a background area of the one or more first characters.

16. A non-transitory computer-readable recording medium comprising commands enabling an electronic device to:

display a first handler, a second handler and a plurality of characters on a display of the electronic device, wherein the first handler is displayed to face a first direction and the second handler is displayed to face a second direction different from the first direction;

display a first visual effect on one or more first characters among the plurality of characters based on a position corresponding to the first direction of the first handler and a position corresponding to the second direction of the second handler;

receive a drag input for moving the first handler;

display the first handler on a first position touched according to the drag input while the drag input is received;

based on the first position touched according to the first drag input being less than or equal to a predetermined distance away from a side of the display, rotate the first handler, wherein based on the first handler being rotated, at least a part of the rotated first handler is displayed within an area that is greater than the first predetermined distance away from the side of the display and the rotated first handler is displayed to face the second direction; and display a second visual effect on one or more second characters among the plurality of characters based on a position corresponding to the second direction of the rotated first handler and the position corresponding to the second direction of the second handler.

* * * * *